United States Patent [19]

Karnes

[11] Patent Number: 5,135,287
[45] Date of Patent: Aug. 4, 1992

[54] CURB CUTTER

[76] Inventor: Kenneth Karnes, 7138 NW. Mace Rd., Parkville, Mo. 64152

[21] Appl. No.: 589,812

[22] Filed: Sep. 24, 1990

[51] Int. Cl.⁵ .............................................. E01C 23/09
[52] U.S. Cl. ................................... 299/39; 125/13.03; 299/76; 404/90
[58] Field of Search ...................... 299/38, 39, 41, 76; 404/90; 125/13.01, 13.03, 14; 83/490

[56] References Cited

U.S. PATENT DOCUMENTS

| | | | |
|---|---|---|---|
| 3,785,705 | 1/1974 | Binger | 299/75 |
| 4,094,102 | 6/1978 | Lauze et al. | 125/13.03 X |
| 4,134,459 | 1/1979 | Hotchen | 173/32 |
| 4,353,275 | 10/1982 | Colville | 83/488 |
| 4,357,120 | 11/1983 | MacDonald | 404/83 |
| 4,433,871 | 2/1984 | Bertrand | 299/41 |
| 4,778,304 | 10/1988 | Baldi | 404/87 |
| 4,832,412 | 5/1989 | Bertrand | 299/39 |
| 4,900,094 | 2/1990 | Sergeant | 299/39 |

FOREIGN PATENT DOCUMENTS 142277  5/1985  European Pat. Off. ............. 299/39

*Primary Examiner*—David J. Bagnell
*Attorney, Agent, or Firm*—Michael Yakimo, Jr.

[57] ABSTRACT

A curb cutter for use by a mobile operator comprises a boom having a saw assembly at one end thereof. The boom is user-movable through vertical and lateral directions so as to place the saw at a desired location. The up and down movement of the boom is controlled by a separate cam assembly with lateral movement of the curb cutter being diminished by a ground engaging spike assembly during use. The device allows for the use of various boom lengths according to the job at hand.

16 Claims, 5 Drawing Sheets

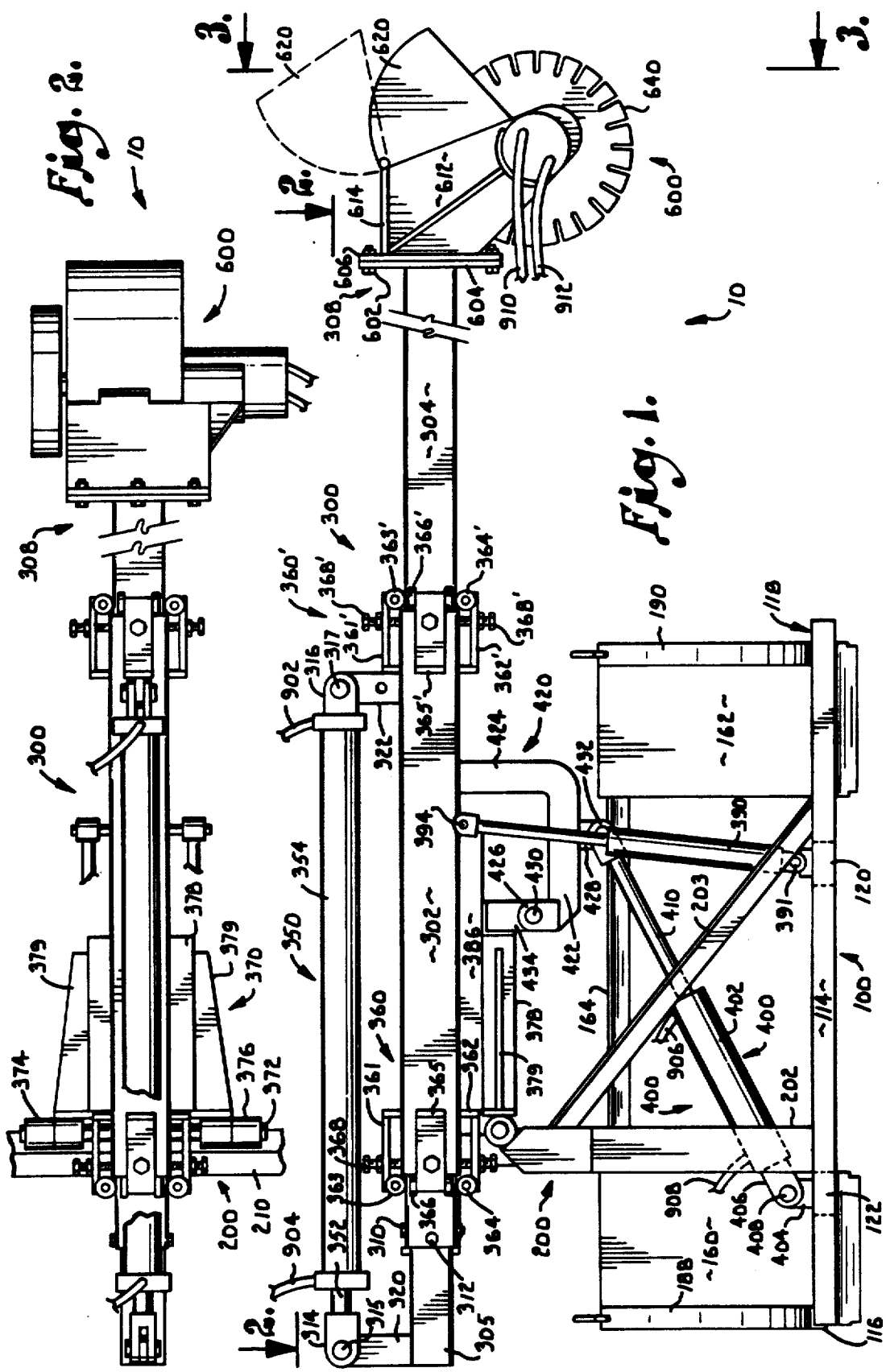

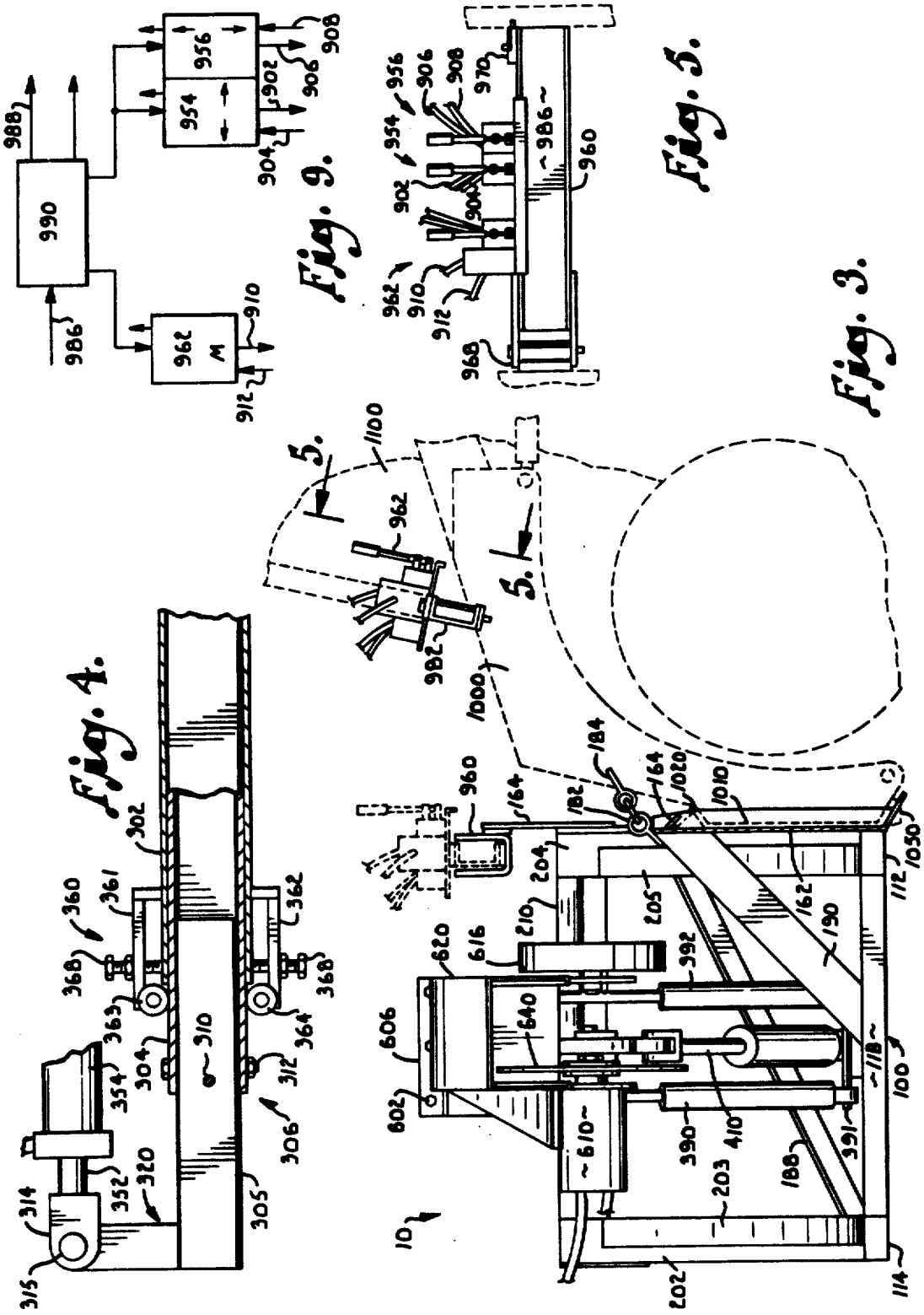

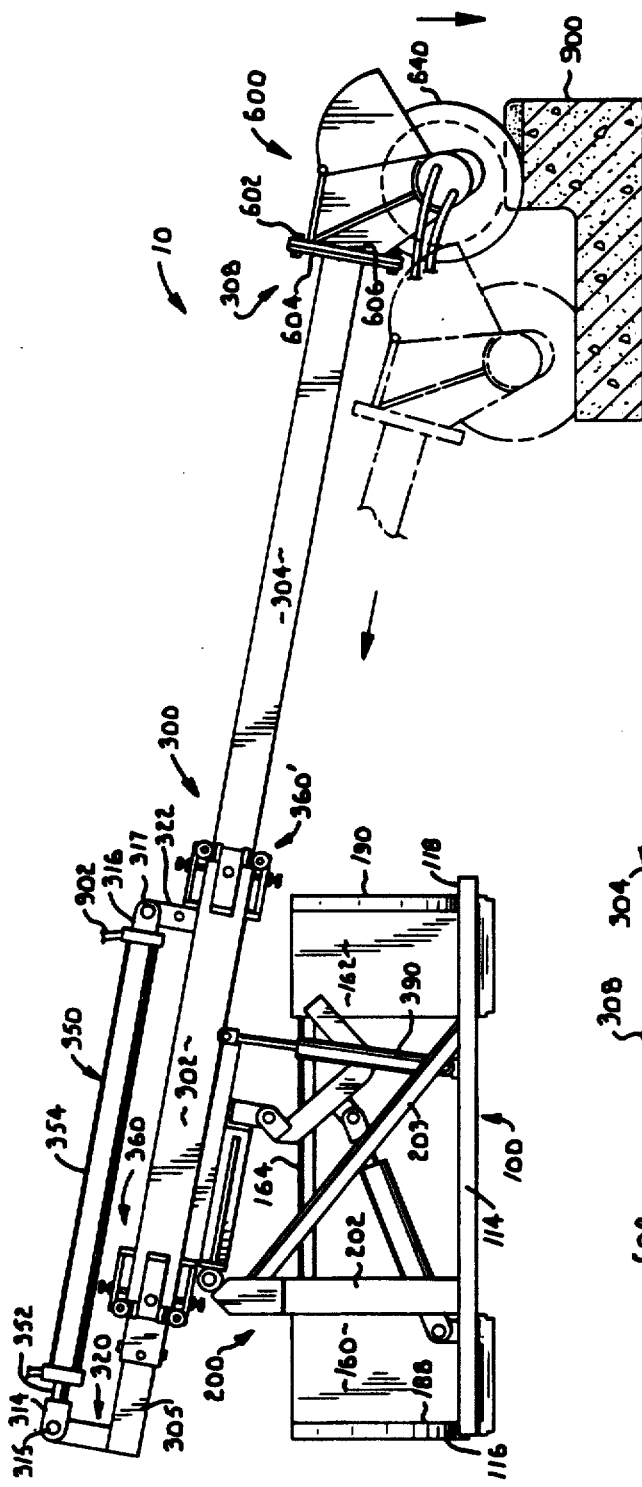
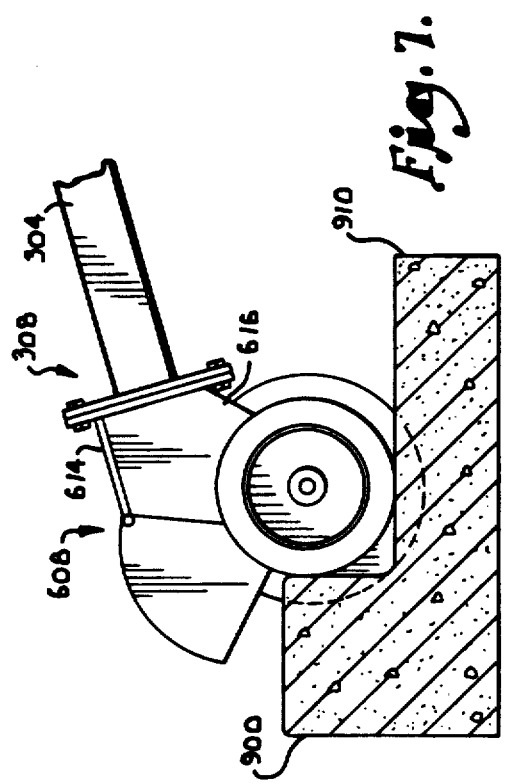
Fig. 6.
Fig. 7.

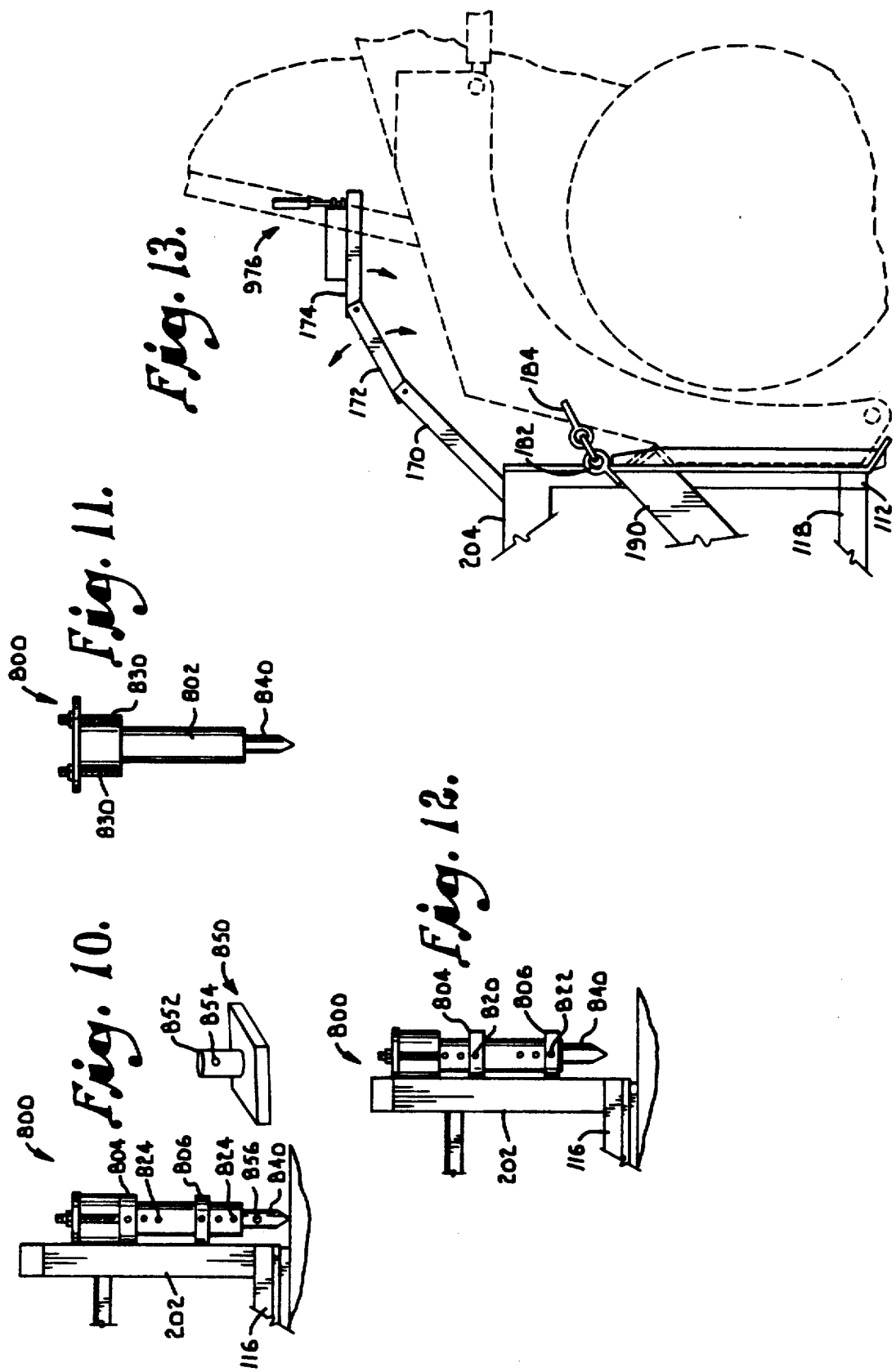

CURB CUTTER

BACKGROUND OF THE INVENTION

This invention relates to concrete cutting apparatus and more particularly to an apparatus for cutting contraction joints in concrete curbs which is releasably attachable to a skid loader or the like.

In order to control the cracking of concrete median walls, strips, curbs, sidewalks and the like, it is desirable and in some instances required by specification to cut spaced-apart contraction joints into said structures. Such joints are spaced at selected intervals so that the cracking or fracture of the concrete will occur at the joints rather than along the longitudinal extent of the structure. Such latter uncontrolled cracking would lead to an unsightly appearance and possibly result in a decrease in the concrete strength.

Currently, such contraction joints are cut into the curbs by workers holding heavy concrete saws. Such work is very laborious, dirty and time consuming. The resulting concrete dust can harm not only the worker but also congests in the saw itself which requires periodic cleaning to prevent saw malfunction.

In an attempt to alleviate this labor intensive function, vehicle-type devices have arisen which have cutting saws operated by a remote driver. Although assumably effective in operation, such devices are relatively complex and expensive devices and are not adapted to be releasably attached to conventional construction vehicles, such as skid loaders, which can normally be found in a construction contractor's vehicle pool.

In response thereto I have invented a concrete cutting apparatus which is releasably mounted to the front of a skid loader, such as a Bobcat or the like. The device includes a frame having a hydraulically powered saw mounted at the end of a hydraulically controlled boom. The hydraulic saw is controlled by a skid loader driver through horizontal and cam-regulated, vertical directions so as to direct the saw against a curb or the like for subsequent cutting. A dampener delimits excessive lateral movement of the device during operation. My device allows the operator to saw the curb from a remote location thus removing the disadvantages resulting from the use of a hand-held concrete saw.

Accordingly, it is a general object of this invention to provide apparatus for cutting joints in concrete curbs or the like from a remote position.

Another object of this invention is to provide apparatus, as aforesaid, which is easily attachable to a construction type vehicle for subsequent transport and use.

Still another object of this invention is to provide apparatus, as aforesaid, having a hydraulic saw at the end of an operator controlled boom which is movable in selectable horizontal and cam-controlled, vertical directions.

A further object of this invention is to provide apparatus, as aforesaid, which is easily movable between operable and storage positions.

Another particular object of this invention is to provide apparatus, as aforesaid, which delimits undesirable lateral movement of the saw during operation.

Other objects and advantages of this invention will become apparent from the following description taken in connection with the accompanying drawings, wherein is set forth by way of illustration and example, an embodiment of this invention.

BRIEF DESCRIPTION OF THE DRAWINGS

FIG. 1 is a front elevation view of the curb cutter apparatus with the boom being foreshortened for the purposes of illustration;

FIG. 2 is a top view of the curb cutter as viewed along lines 2—2 in FIG. 1 with the underlying frame being removed for purposes of illustration;

FIG. 3 is a side elevation view, taken along lines 3—3 in FIG. 1, illustrating the attachment of the curb cutter to a representative skid loader as shown in phantom lines;

FIG. 4 is a partial fragmentary side view on an enlarged scale illustrating the proximal end of the extensible boom assembly with a portion of the boom housing sectioned and broken away to show the boom end connection;

FIG. 5 is an elevation view as taken along lines 5—5 in FIG. 3, illustrating one form of the hydraulic controls for the curb cutter;

FIG. 6 is a front elevation view showing the initial position of the cutting saw and, in phantom lines, the final position of cutting saw after use;

FIG. 7 is a partial elevation view illustrating one use of the curb cutter on a high back curb;

FIG. 9 is a diagrammatic view illustrating the hydraulic flow paths;

FIG. 10 is a partial fragmentary side elevation view illustrating the means for limiting lateral movement of the curb cutting apparatus during operation position and an alternative ground engaging element at one side thereof;

FIG. 11 illustrates the device of FIG. 10 removed from the curb cutter;

FIG. 12 illustrates the device of FIG. 10 in a transport position; and

FIG. 13 illustrates an alternative means for mounting the hydraulic controls to the curb cutter.

DESCRIPTION OF THE PREFERRED EMBODIMENT

Figure 8:
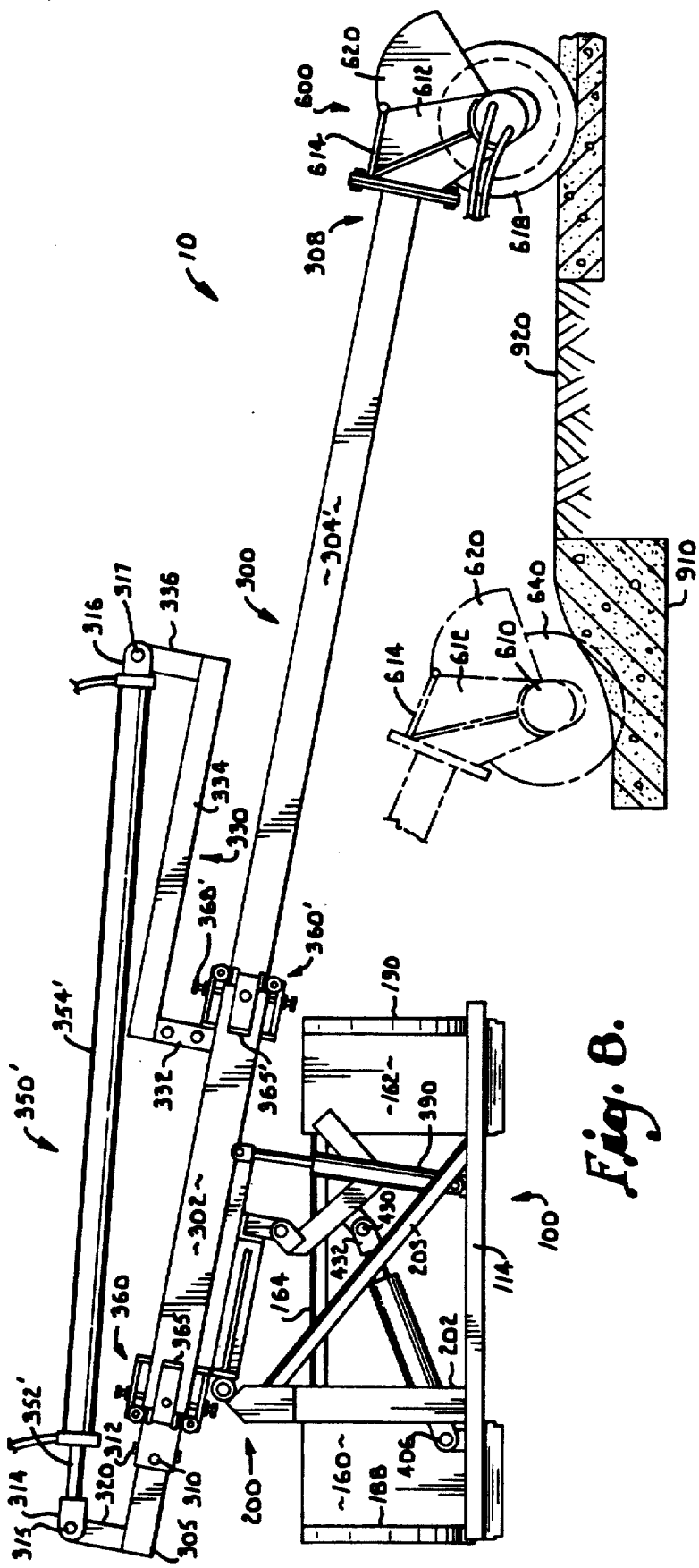
FIG. 8 illustrates the use of the curb cutter with an elongated boom along a sidewalk and adjacent lazy back curb.

Turning more particularly to the drawings, FIG. 1 illustrates the curb cutting apparatus 10 as removed from the transport vehicle. Device 10 generally comprises a support frame 100 having extensible boom assembly 300 mounted thereto. At the free end of the boom assembly is located a hydraulically-powered saw assembly 600 for cutting the grooves in the high back curb 900, lazy back curb 910, sidewalk 920 or the like. The boom assembly 300 and saw assembly 600 are controlled by a hydraulic system 900 as to be described.

The base frame assembly 100 comprises a generally rectangular frame formed by first and second longitudinally spaced-apart lateral extending struts 112, 114 with a pair of laterally spaced-apart longitudinal extending struts 116, 118 extending therebetween.

Upwardly extending from the rear lateral strut 112 is a mounting assembly 150. The assembly 150 comprises upwardly extending plates 160, 162 having a reinforcing mounting strut 164 laterally extending therebetween. Each plate 160, 162 has a lower angled lip 166 with an aperture 168 therein. The front mounting plate 1010 of the skid loader 1000 presents a lip 1020 which engages the lip presented by the mounting strut 164. Within the mounting plate 1010 are left and right user-extensible pins 1050 which engage the apertures 168 in each plate 160, 162. The mounting plates 160, 162 and bar 164 are provided by the vehicle 1000 manufacturer and are a conventional means of attaching apparatus to the mounting plate 1010 of the loader. I associate my device 10 with this means of attachment.

A diagonal strut 188, 190 extends between each plate 160, 162 and longitudinally extending struts 116, 118 to provide reinforcement thereto.

Upwardly extending from the base frame assembly 100 is a boom support assembly 200. This assembly comprises a pair of vertical columns 202, 204 upwardly extending from the respective lateral struts 112, 114. Diagonally extending reinforcing struts 203, 205 extend between each vertical column 202 and 204 and the adjacent lateral strut 114, 112. A horizontal mounting arm 210 extends between the longitudinally spaced-apart columns 202, 204.

Boom assembly 300 comprises a generally rectangular, hollow boom housing 302 having an elongated boom 304 slidably extending therethrough. The hollow boom 304 has a proximal end 306 and distal end 308, relative to the operator. A boom extension arm 305 extends within the open proximal end 306 of boom 304 and is releasably connected thereto by bolt/nut combinations 310, 312.

Upwardly extending from the free end of boom extension arm 305 is bracket 320 with a similarly spaced-apart bracket 322 upwardly extending from the housing 302. A piston/cylinder combination 350 presents a piston rod 352 slidable within cylinder 354. Rod 352 is releasably mounted to bracket 320 by means of pin 315 extending through bracket 314 and bracket 320. The end of cylinder 354 is attached to bracket 322 by means of pin 317 extending through brackets 316, 322. Accordingly, the back and forth movement of the rod 352, relative to cylinder 354, will likewise move the boom extension 305 and connected boom 304 in similar directions. Thus, the length of extension of boom 304 beyond housing 302 depends on rod 352 movement.

FIG. 8 illustrates an alternative piston/cylinder combination with similar parts being designated with prime numbers. This assembly allows for the use of an elongated boom 304'. As such, the elongated piston rod 252' is mounted to bracket 320 via the bracket 314/pin 315 combination. An alternative cylinder mounting bracket 330 is presented which comprises a first bracket 332 mounted to housing 302. An elongated arm 334 extends from bracket 332 and has a cylinder mounting bracket 336 normal thereto. The cylinder end is mounted to this bracket 336 by means of bracket 316/pin 317 combination. As such, bracket 330 allows for an elongated piston 352'/cylinder 354' combination to be mounted to the boom housing 302 for movement of the elongated boom 304'.

Mounted along the housing 302 are first and second roller assemblies 360, 360'. Each assembly 360, 360' comprises like parts and are thus distinguished as to assembly 360' by primed numbers. Each assembly 360, 360' comprises brackets 361, 362 having rollers 363, 364 bearing along the top and bottom surfaces of boom 304. Side brackets (front side bracket 365 shown only) have rollers 366 bearing against the side surfaces of boom 304. Each roller is maintained along the respective boom surfaces by the bolt/nut combination 368 extending through each bracket. Accordingly, the roller assemblies 360, 360' offer rolling support to the boom 304 during slidable movement of boom 304 through housing 302.

The above-described boom assembly 300 is attached to the mounting arm 210 by a pivot assembly 370 as best seen in FIG. 2. This assembly comprises a pivot pin 372 extending between spaced-apart collars 374, 376 which are affixed to the underlying mounting arm 210. The pin 372 also extends through collars 382, 384 of plate 378 which is attached to the underside of a reinforced strut 386 on the underside of the housing 302. Plate 378 has a reinforcing wing-like rib 379 extending therealong. Accordingly, plate 378 is rotatable about pin 372 to provide like movement to the associated boom housing 302 and boom 304 mounted therein.

Upwardly extending from an intermediate, strut 120 which spans lateral struts 112, 114 are a pair of shock absorbers 390, 392. The lower end of each shock absorber 390, 392 is pivotally attached about pin 391 mounted to strut 112. The upper ends of each absorber are joined by a spanning pin 394 which underlies housing 302. (Alternatively, a closed loop hydraulic shock may be used in lieu of these conventional shock absorbers. Such a shock includes a user-operable hydraulic control to regulate the dampening action of the absorber.)

Further extending from an intermediate strut 121 which spans lateral struts 112, 114 is a hydraulically-controlled piston/cylinder combination 400. The cylinder 402 is connected to an upstanding bracket 404 on strut 121 via a bracket 406/pin 408 combination. The free end of piston rod 410 is pivotally attached to a depending bracket 428 of cam assembly 420 by a pin 430/piston rod bracket 432 combination. The cam assembly 420 generally comprises a first horizontal arm 422, as viewed in FIG. 1, vertical leg 424 and mounting bracket 426.

Bracket 426 is pivotally mounted to a flange 434 depending from plate 378 by means of pivot pin 430 extending through bracket 426 and flange 434. The free end of leg 424 rests on the underside of boom housing 302 when the housing 302 is in a generally horizontal position as shown in FIG. 1. As such, the extension of rod 410 from cylinder pivots arm 422 and associated leg 424 about pin 430. Thus, rod 410 movement causes the cam assembly 420 and supported boom housing 302 to rotate in clockwise or counterclockwise directions between FIG. 1 and FIG. 6 positions. At the FIG. 6 position the free end of leg 424 is clear of housing 302 which transfers the weight of the boom assembly 300 to the saw assembly 600 and curb 900.

Mounted to the distal end 308 of boom 304 is a hydraulic saw assembly 600. Attachment of the saw assembly 600 is accomplished by bolt/nut 602 combination securing mounting plate 606 on the saw assembly to a mounting plate 604 at the end of the boom 304. The saw assembly 600 comprises a hydraulically-powered saw blade 640 mounted within housing 608. A hydraulic motor 610 is attached to the exterior of a side plate 612 of housing 608 and functionally engages saw blade 640 positioned on the opposed side of side plate 612. A top plate 614 extends between the side plates 612, 616. A cover 620 is pivotally mounted to top plate 614 to protect blade 640 when not in use. Rotatably mounted to an opposed side plate 616 of housing 608 is a guide wheel 616 for a purpose as to be subsequently described.

A hydraulic system 900 is diagrammatically shown in FIG. 9 and routes hydraulic fluid to the piston/cylinder combinations 350, 400 and hydraulic motor 610 via the controls in FIG. 5. As such, input and return hydraulic lines 902/904, 906/908 and 910/912 are in fluid communication with the respective cylinders 354, 402 and motor 610.

The associated hydraulic controls 954, 956, 962 are mounted on a block 986 which is placed in a carriage 982 extending from strut 164 during transport. The control 962 regulates hydraulic fluid to the motor 610, control 954 regulates fluid to piston/cylinder combination 350 and control 956 regulates fluid to piston/cylinder combination 400. The block 986 with controls thereon is removed from transport carriage 982 and placed within mounting brackets 968, 970 which are attached to the opposed sides of the vehicle case 1100. Accordingly, the controls transversely span the vehicle operator when the curb cutter is in use. The system is placed in communication with the conventional hydraulic tank of the associated skid loader. The fluid in the skid loader tank is first delivered from the tank to a fluid divider 990 via line 986. The divided fluid is delivered to the respective control valves 962, 954, 956. A return line 988 from the fluid divider to the tank completes the fluid communication circuit between the fluid reservoir/tank and the skid loader. Input lines 902, 906, 910 deliver the fluid to the cylinders 354, 402 and motor 610 with return lines 904, 908, 912 completing the circuit flow.

An alternative form of control mounting apparatus is shown in FIG. 13. As shown, this device includes a mounting arm 170 having a pair of pivotal arms 172, 174 pivotally mounted thereto. A three way hydraulic control 176 controlling all flow is mounted to the end of arm 174. The pivotal movement of arms 174 and 176 allows for the control 976 to be swung towards the driver for use and away from the driver and adjacent the mounting arm 170 when the cutter 10 is not in use. Thus, there is no need to mount the controls to the vehicle 1000.

In use the apparatus 10 is attached to the front plate of skid loader 1000 as partially shown in phantom lines in FIG. 3. The skid loader 1000 utilized is a Bobcat 743 made by Clark Manufacturing but my apparatus 10 is adaptable for use with other types of vehicles. The plate lip 1020 engages the mounting flange 164 as previously described. Subsequently, a locking pin 1050 within each plate 160, 162 is moved into apertures 168 in plates 160, 162 to engage the same. I-bolts 182 at the top of the plates 160, 162 and I-bolts 184 on the vehicle are joined by locking links 183. This is a conventional method of attaching the mounting plates 160, 162 to the skid loader. Upon placement the valve controls can then be placed in front of the driver either using the FIG. 5 or FIG. 13 structure.

In operation, the skid loader 1000 is driven to a parallel location adjacent the curb 900 so that the boom 304 is in a perpendicular relationship to the curb 900. Control 954 is operated so as to regulate the hydraulic fluid flow to cylinder 354 such that piston rod 352 is withdrawn within cylinder 354. This action is transmitted to boom extension 305 so as to extend boom 304 beyond the housing 302 to a point above the curb 900. Likewise, control 956 is operated to control release and/or delivery of a hydraulic fluid flow to the piston/cylinder combination 400. As shown in FIG. 1, piston rod 410 is in an extended position such that cam leg 424 rests underneath the housing 302 and holds the same in horizontal position. Upon extension and withdrawal of piston rod 410 relative to cylinder 402, arm 422 pivots in clockwise or counterclockwise directions about pin 430. This action controls up and down movement of leg 424 and thus up and down movement of the boom 304 about pivot pin 372. Thus, up and down movement of the boom and attached saw assembly 600 is also controlled so as to initially position the saw assembly 600 as shown in FIGS. 6 and 8.

Upon positioning the saw assembly 600, hydraulic fluid is delivered via control 962 to the hydraulic motor 610 causing rotation of the cutting blade 640. During such blade 640 rotation the boom 304 is being withdrawn according to the desired length of the groove to be cut. The guide wheel 616, as shown in FIG. 7, likewise follows the groove in a parallel position thereto. The wheel 616 is effective in controlling movement of the blade 640 between relative vertical positions. Absent the wheel 616 the saw blade 640 may quickly drop and either cut too deep or damage the blade. The guide wheel 616 also enhances the longitudinal movement of the saw blade 640 and controls the depth of penetration of the cutting blade 640. The shock absorbers 390, 392 also serve to dampen undesirable vertical movement. Once the cutting process is finished the boom 304 is returned to its FIG. 1 transport position and the vehicle is moved to the next desired curbside location. It is understood that various measuring devices can be attached to the tractor so as to present indicia to the operator of the next desired curbside location.

I have found that during the cutting process that there is significant lateral movement of the skid loader 1000 which is transferred to the curb cutter 10. Such movement can degrade the cutting process. Accordingly, I have devised a device for dampening this lateral movement. I provide an assembly 800 as shown in FIGS. 10-12. This assembly 800 comprises a housing 802 having a spring biased spike 840. The assembly 800 is mounted within collars 804, 806 mounted to the front of column 202. FIG. 11 shows the device 800 in a transport position. The device is held at such position by means of pins 820, 822 extending through apertures 824 in the collars 804, 806 and in the housing 802. During use the pins 820, 822 are removed such that the vertical bolts 830 rest against the top collar 804. The pins 820, 822 are then reinserted through the aligned collar and housing apertures. As such, the pointed end of spike 840 is urged into the ground by the weight of the device 10 thereon. The entry of the spike into the ground dampens the lateral movement of the device 10 during use.

An alternative plate 850 is shown in FIG. 10 for use on asphalt or street surfaces. The spike 840 end is placed in the collar 852 with a pin placed in the aligned apertures 854, 856 to hold the plate 850 thereon. Plate 850 bears against the street surface to diminish lateral shifting of the device 10 during use.

Accordingly, as above described, I provide a powered cutting blade device 10 which alleviates the manual labor-intensive process normally associated with the curb sawing function. Moreover, the operator is displaced from the curbside position so as to be displaced from the resulting dirt, grime, dust and the like. Furthermore, I provide a relatively simple apparatus which is easily adaptable for attachment to skid loaders or the like.

Although I have described a preferred embodiment and alternatives thereof of the invention herein, it is understood that it is not to be limited thereto, except in so far as such limitations are included in the following claims and allowable functional equivalents thereof.

Having thus described the invention, what is claimed as new and desired to be secured by Letters Patent is:

1. A concrete sawing machine for attachment to a vehicle comprising:
    a support frame comprising:
        a generally horizontal base frame;
        a mounting frame vertically extending from said base frame;
        fastener means on said mounting frame for releasably engaging a complementary element on the vehicle, said engagement mounting said support frame on the vehicle with said base frame adjacent a ground surface supporting the vehicle;
    an extensible and retractable boom assembly;
    means for hydraulically controlling said extension and retraction of said boom assembly;
    a saw assembly;
    means for mounting said saw assembly to an end of said boom assembly;
    means for hydraulically controlling operation of said saw assembly;
    means upwardly extending from said base frame for pivotally mounting said boom assembly above said base frame in up and down movement relative thereto, said mounted boom assembly displacing said mounted saw assembly beyond said base frame;
    means extending between said support frame and said boom assembly for hydraulically controlling said pivotal movement of said boom assembly, said plurality of hydraulic control means intercooperating to position said saw assembly at a desired position displaced beyond said base frame for operation thereat.

2. The device as claimed in claim 1 wherein said means for hydraulically controlling said pivotal movement of said boom comprises:
    a cam member having first and second ends;
    means for pivotally mounting said first end of said cam in up and down movement;
    said hydraulic means moving said cam member in counterclockwise movement or clockwise movement, said cam transmitting said movements to said boom in like directions.

3. The device as claimed in claim 1 wherein said means for dampening said lateral movement comprises:
    a spike assembly;
    means for selectably mounting said spike assembly to said frame in a ground engaging position during said saw assembly operation, said ground engagement diminishing lateral movement of said frame.

4. The device as claimed in claim 3 wherein said spike assembly mounting means comprises:
    a post extending from said frame;
    means for maintaining said spike assembly along the length of said post in at least said ground engaging position.

5. The device as claimed in claim 4 wherein said maintaining means comprises:
    a collar on said post for slidably receiving said spike assembly therein;
    an aperture in said collar;
    a series of apertures along said spike assembly;
    a pin extensible through said collar aperture and one of said spike assembly apertures, said aligned apertures positioning said spike assembly in a ground engaging position.

6. The device as claimed in claim 1 wherein said vehicle is a skid loader presenting a mounting plate as the complementary male element, said fastener means on said mounting frame comprising a flange for engaging the lip.

7. The device as claimed in claim 1 wherein said boom assembly comprises:
    a boom housing;
    a boom having first and second free ends and slidable through said housing, said saw assembly mounted to said second end;
    said means for hydraulically controlling said extension and retraction of said boom assembly comprising:
        a hydraulic cylinder;
        a piston with rod slidable in said cylinder;
        a linkage arm attached to a free end of said rod;
        means for attaching said arm to said first end of said boom opposite said second end;
        means for routing a hydraulic fluid through said cylinder to slide said piston in back and forth directions therein, said movement transferred to said boom through said linkage arm.

8. A concrete sawing machine for attachment to a vehicle comprising:
    a support frame;
    a boom housing;
    means for hydraulically controlling said extension and retraction of a boom within said housing comprising:
        a piston/cylinder combination having a length varying in proportion to the length of said boom;
        hydraulic flow means in communication with said cylinder for varying the length of extension and retraction of said piston relative to said cylinder; and
        means for transmitting said length of extension and retraction of said piston to said boom whereby to control said extension and retraction of said boom relative to said boom housing;
    means for mounting a boom of a selectable length within said boom housing comprising:
        means for mounting a free end of said piston to an end of said boom;
        means for mounting a free end of said cylinder to an end of said boom housing, said means comprising:
            a bracket mounted to said boom housing;
            an arm extending from said bracket and generally in the direction of said boom;
            means for attaching said free end of said cylinder to a free end of said arm, whereby said arm of said bracket extends for a length to allow for said piston/cylinder combination to be mounted between said piston mounting means and said cylinder mounting means, whereby movement of said piston of said intermediate piston/cylinder combination is transmitted to said boom;
    a saw assembly;
    means for mounting said saw assembly to an end of said boom;
    means for controlling operation of said saw assembly;
    means for mounting said boom and housing to said frame in up and down movement relative thereto; and
    means for controlling said pivotal movement of said boom.

9. A concrete sawing machine for attachment to a vehicle comprising:
 a support frame including a horizontal base frame and vertical mounting frame;
 an extensible and retractable boom assembly;
 means for hydraulically controlling said extension and retraction of said boom;
 a saw assembly;
 means for mounting said saw assembly to an end of said boom;
 means for hydraulically controlling operation of said saw assembly;
 a first vertical column attached to said base frame;
 a second vertical column attached to said base frame and spaced from said column;
 an arm extending between said first and second columns;
 means for attaching a pivot pin between said columns and above said base frame;
 means for attaching said boom assembly to said pivot pin in pivotal movement relative thereto and in up and down movement relative to said base frame;
 means on said support frame for hydraulically controlling said pivotal movement of said boom assembly;
 means for dampening lateral movement of said support frame during said saw assembly operation.

10. A concrete sawing machine for attachment to a vehicle comprising:
 a support frame;
 an extensible and retractable boom assembly;
 means for controlling said extension and retraction of said boom assembly;
 a saw assembly;
 means for mounting said saw assembly to an end of said boom;
 means for hydraulically controlling operation of said saw assembly;
 means for pivotally mounting said boom assembly to said frame in up and down movement relative thereto;
 means for controlling said pivotal movement of said boom comprising:
  a cam having first and second ends;
  means for pivotally mounting said first end of said cam in counterclockwise and clockwise movements relative to said boom assembly;
  hydraulic means on said support frame for directing said cam in said movements and into and out of engagement with said boom assembly, said cam movements controlling said up and down movement of said boom assembly relative to said support frame.

11. The device as claimed in claim 10 wherein said boom assembly comprises:
 a boom housing;
 a boom extensible and retractable relative to said housing, said cam engaging said boom housing to preclude interference with said extension and retraction of said boom relative to said boom housing.

12. The device as claimed in claim 11 wherein said hydraulic means comprises:
 a cylinder;
 means for mounting said cylinder on said support frame;
 a piston slidable within said cylinder and including a rod having a free end displaced from said cylinder;
 means for fastening said piston rod free end to said cam;
 means for regulating a flow of a hydraulic fluid through said cylinder, said fluid moving said piston in said cylinder for movement of said rod and fastened cam in a first direction for engagement of said cam with said boom housing and a second direction for disengaging said cam from said boom housing.

13. The device as claimed in claim 10 further comprising means for dampening lateral movement of said frame during said saw assembly operation.

14. A concrete sawing machine for attachment to a vehicle comprising:
 a support frame;
 an extensible and retractable boom assembly;
 means for controlling said extension and retraction of said boom assembly;
 a saw assembly;
 means for mounting said saw assembly to an end of said boom;
 means for controlling operation of said saw assembly;
 means for pivotally mounting said boom assembly to said frame in up and down movement relative thereto;
 means for controlling said pivotal movement of said boom;
 means for dampening lateral movement of said frame during said saw assembly operation, said means comprises:
  a spike assembly;
  means for selectably mounting said spike assembly to said frame in a ground engaging position during said saw assembly operation, said ground engagement diminishing lateral movement of said frame.

15. The device as claimed in claim 14 wherein said spike assembly mounting means comprises:
 a post extending from said frame;
 means for maintaining said spike assembly along the length of said post in at least said ground engaging position.

16. The device as claimed in claim 15 wherein said maintaining means comprises:
 a collar on said post for slidably receiving said spike assembly therein;
 an aperture in said collar;
 a series of apertures along said spike assembly;
 a pin extensible through said collar aperture and one of said spike assembly apertures, said aligned apertures positioning said spike assembly in a ground engaging position.

* * * * *

UNITED STATES PATENT AND TRADEMARK OFFICE
CERTIFICATE OF CORRECTION

PATENT NO. : 5,135,287
DATED : August 4, 1992
INVENTOR(S) : Kenneth Karnes

It is certified that error appears in the above-identified patent and that said Letters Patent is hereby corrected as shown below:

Column 7, line 46, delete "wherein said".

Column 7, line 47, delete "means for dampening said lateral movement comprises:" and substitute --further comprising means for dampening lateral frame movement which comprises:--.

Column 8, line 2, after the word "plate" insert --with lip--.

Column 8, line 3, delete "male".

Signed and Sealed this

Thirty-first Day of August, 1993

Attest:

BRUCE LEHMAN

Attesting Officer    Commissioner of Patents and Trademarks